(12) United States Patent
Noguchi

(10) Patent No.: US 7,132,066 B2
(45) Date of Patent: Nov. 7, 2006

(54) METHOD FOR PRODUCING HONEYCOMB STRUCTURE AND HONEYCOMB STRUCTURE

(75) Inventor: Yasushi Noguchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/932,030

(22) Filed: Sep. 2, 2004

(65) Prior Publication Data

US 2005/0069675 A1 Mar. 31, 2005

(30) Foreign Application Priority Data

Sep. 30, 2003 (JP) ............................... 2003-339743

(51) Int. Cl.
*C04B 35/622* (2006.01)

(52) U.S. Cl. ............. 264/37.3; 264/37.32; 264/177.11; 264/177.13; 264/211.11

(58) Field of Classification Search ..................... None
See application file for complete search history.

(56) References Cited

U.S. PATENT DOCUMENTS

| | | | | |
|---|---|---|---|---|
| 3,631,131 A | * | 12/1971 | Kopko | ........................ 521/40.5 |
| 4,417,908 A | * | 11/1983 | Pitcher, Jr. | ................... 55/523 |
| 4,851,376 A | * | 7/1989 | Asami et al. | ................ 501/119 |
| 5,679,292 A | | 10/1997 | Nisimura | |
| 6,146,560 A | | 11/2000 | Behi et al. | |
| 2002/0169065 A1 | | 11/2002 | Kawazu et al. | |
| 2003/0017933 A1 | * | 1/2003 | Sasaki et al. | ................ 501/155 |
| 2004/0053005 A1 | * | 3/2004 | Hamanaka et al. | ......... 428/116 |
| 2004/0115392 A1 | | 6/2004 | Takashi | |

FOREIGN PATENT DOCUMENTS

| | | |
|---|---|---|
| JP | A 60-172506 | 9/1985 |
| JP | B2 3-72032 | 11/1991 |
| JP | A 8-119726 | 5/1996 |
| JP | A 2000-302533 | 10/2000 |
| JP | A 2002-356377 | 12/2002 |
| JP | A 2002-356383 | 12/2002 |
| JP | A 2003-34582 | 2/2003 |
| JP | A 2004-224659 | 8/2004 |
| WO | WO 97/36843 | 10/1997 |

* cited by examiner

*Primary Examiner*—Mark Eashoo
(74) *Attorney, Agent, or Firm*—Oliff & Berridge, PLC

(57) ABSTRACT

A method for producing a honeycomb structure using, as a part of a starting material, a recycled raw material recycled from a recovered material which is produced in the production process of the honeycomb structure and originates from the starting material for the honeycomb structure, and further provides the honeycomb structure. The recycled raw material is ground so that it has an average particle diameter of 10–2000 μm and contains 10% or less by weight of particles having an average particle diameter of 2800 μm or more.

9 Claims, No Drawings

METHOD FOR PRODUCING HONEYCOMB STRUCTURE AND HONEYCOMB STRUCTURE

This application is related to U.S. patent application Ser. No. 10/717,502, filed Nov. 21, 2003.

BACKGROUND OF THE INVENTION

The present invention relates to a method for producing a honeycomb structure and a honeycomb structure.

Porous honeycomb structures comprising cell partition walls (ribs) forming a composite of a plurality of cells adjacent to each other and a honeycomb outer wall enclosing and holding outermost cells positioned at outermost periphery of the cell composite are widely used as a filter for catching and removing particulate materials contained in dust-containing fluid such as diesel engine exhaust gas (diesel particulate filter (DPF)) or a catalyst carrier (for purification of exhaust gas) which supports a catalyst component for purification of exhaust gas to remove harmful materials contained therein, and as the materials constituting the honeycomb structures, there are used refractory silicon carbide (SiC), cordierite and composites thereof, etc.

Furthermore, development of DPF is advanced in which a regeneration system is employed which carries out continuous regeneration by supporting an oxidation catalyst on a conventional DPF and oxidizing and burning the deposited particulates (DPF for regeneration of catalyst).

For economical production of the above honeycomb structures, it is preferred from the points of improvement of yield and reduction of cost to prepare (recycle) starting raw materials from recovered materials which originate from starting raw materials for honeycomb structures and which are produced during production of honeycomb structures (for example, unfired dried products such as unfired molded products removed between drying step and firing step for some reasons or fragments thereof (including fired products in the case of SiC)) and reuse them for molding as recycled raw materials.

In the case of cordierite ceramic materials, when unfired dried products which are recovered are ground for using as recycled raw materials, the cordierite ceramic materials produced using the ground powders are, in many cases, greater in coefficient of thermal expansion than cordierite ceramic materials produced using inherent starting raw materials and are deteriorated in thermal shock resistance, and hence they cannot be used as honeycomb catalyst carriers for purification of exhaust gas.

In order to solve the above problems, there are proposed cordierite ceramic materials and methods for producing the same, for example, a method of crushing, grinding and classifying unfired dried products which are recovered materials at light grinding step to prepare (recycle) raw materials and using the recycled raw materials (Japanese Patent No.1703709), a method of removing at least a part of binder contained in unfired recycled raw materials, then grinding the recycled raw material to prepare a ground powder, adding water, binder, etc. to the ground powder, followed by kneading to prepare a recycled clay, and molding and firing the recycled clay (JP-A-2000-302533), and a method of grinding unfired recycled raw material to prepare a ground product, removing powders of below 1 mm in diameter from the ground product, and adding water to the remaining ground product, followed by kneading to prepare recycled clay, molding the recycled clay and firing the molded product (JP-A-8-119726).

However, according to the method of Japanese Patent No.1703709, when the recycled raw materials are ground to a particle size of below 10 μm, not only the grinding efficiency is low to require much cost, but also abrasion of the grinding equipment is great and a large amount of impurities are incorporated.

According to the method of JP-A-2000-302533, since the recycled raw materials are heat treated to remove binder, the production cost is high, and according to the method of JP-A-8-119726, since recycled materials of 1 mm or less are removed, yield of the recycled raw materials is low and the recycled materials are coarse, and hence the dissolution of raw materials at kneading becomes insufficient, resulting in clogging at the time of molding of honeycomb.

Furthermore, in the case of producing a DPF, a coarse raw material must be used for increasing the porosity, but if a ground recycled material containing beyond 20% by weight of particles having an average particle diameter of than 45 μm or less is used, the average pore diameter of the resulting DPF becomes small.

Moreover, in the case of producing a DPF, if a ground recycled material containing beyond 10% by weight of particles having an average particle diameter of 2800 μm or more is used, the recycled raw material is not sufficiently dissolved at the steps of mixing and kneading, and there are possibilities of causing clogging of die during molding to result in defect of cells in the resulting honeycomb structure.

The present invention has been made in view of the above problems in the conventional technologies, and the object of the present invention is to provide a method for producing a honeycomb structure using an unfired recycled raw material (which may be a fired material in the case of SiC) recovered in the course of production of honeycomb structure, wherein the resulting honeycomb structure has low thermal expansion and porosity similar to those of a honeycomb structure obtained using inherent starting raw materials and yield of the honeycomb structure can be improved and production cost can be considerably reduced, and another object is to provide the honeycomb structure.

SUMMARY OF THE INVENTION

That is, the present invention provides a method for producing a honeycomb structure using, as a part of a starting material, a recycled raw material recycled from a recovered material which is produced in the course of production of a honeycomb structure and originates from the starting material for the honeycomb structure, wherein the recycled raw material is ground so that it has an average particle diameter of 10–2000 μm and contains 10% or less by weight of particles having an average particle diameter of 2800 μm or more, and further provides the honeycomb structure.

In the present invention, it is preferred that the recycled raw material is ground so that it has an average particle diameter of 100–1000 μm and contains 20% or less by weight of particles having an average particle diameter of 45 μm or less and 10% or less by weight of particles having a particle diameter of 1400 μm or more.

Moreover, in the present invention, it is preferred that the recovered material is an unfired dried material, and the honeycomb structure comprises a cordierite material.

Further, in the present invention, it is preferred that the honeycomb structure has a filter structure in which the cells are alternately plugged in a checkered flag pattern at both end faces.

In the case of the present invention, one may obtain honeycomb structures having a lower thermal expansion and porosity similar to those of honeycomb structure produced by using virgin raw materials, while the recycled materials recovered from the unaccepted honeycomb structures and the recovered materials from the starting materials in the production of the honeycomb structures are used at least in part for the raw materials therefore. Thus, one may say that the present inventive method for producing honeycomb structures can produce honeycomb structures at lower cost with saving the materials to be consumed in total.

DETAILED DESCRIPTION OF THE INVENTION

The method for producing a honeycomb structure according to the present invention uses, as a part of a starting material, a recycled raw material recycled from a recovered material which is produced in the course of production of honeycomb structures and originates from the starting material for the honeycomb structures, and is characterized in that the recycled raw material is ground so that it has an average particle diameter of 10–2000 μm and contains 10% or less by weight of particles having an average particle diameter of 2800 μm or more. This is because if the recycled raw material is ground to an average particle diameter of below 10 μm, not only the grinding efficiency is low to require much cost, but also abrasion of the grinding equipments is great and a large amount of impurities are incorporated.

If the recycled raw material contains beyond 10% by weight of particles having an average particle diameter of 2800 μm or more, the recycled raw material is not sufficiently dissolved at the steps of mixing and kneading, and there are possibilities of causing clogging of the die during molding to result in defects of cells in the resulting honeycomb structure. In addition, after firing, the resulting honeycomb structure (fired product) increases in coefficient of thermal expansion (CTE).

In the present invention, it is more preferred to grind the recycled raw material so that it has an average particle diameter of 50–1000 μm and contains 20% or less by weight of particles having a particle diameter of than 45 μm or less and 10% or less by weight of particles having a particle diameter of 1400 μm or more. This is because especially when it is used as a material for DPF, if particles having an average particle diameter of below 45 μm are contained in an amount of beyond 30% by weight in the recycled raw material, average pore diameter of the resulting DPF decreases.

Furthermore, in the present invention, it is preferred that the recycled raw material is contained in an amount of 1–70% by weight of the starting raw material in the production of the honeycomb structure. This is because if the content of the recycled raw material exceeds 70% by weight, reactivity of the raw material particles becomes extraordinary due to grinding to cause increase of coefficient of thermal expansion.

Furthermore, in the present invention, it is preferred that the recovered material originating from the starting raw material for honeycomb structure and produced in the course of production of the honeycomb structure is an unfired dried product. This is because in the case of producing a cordierite-based honeycomb structure, it is essential to use the recycled raw material made into cordierite material.

Moreover, in the case of producing a silicon carbide-based honeycomb structure, the recycled raw material used may be either an unfired dried material or a fired material.

When the recovered material is undried material, it is preferred to sufficiently dry the material before use.

From the above, according to the present invention, in the production of a honeycomb structure using a recovered material originating from the starting material for honeycomb structures and produced in the course of production of the honeycomb structures, the resulting honeycomb structure has nearly the same low coefficient of thermal expansion and porosity as those of honeycomb structures obtained using the inherent starting raw materials, and, besides, improvement of yield and sharp reduction of cost can be attained.

Further, the method for production of a honeycomb structure according to the present invention can be suitably used not only for production of a catalyst carrier (for purification of exhaust gas) for supporting catalyst components which purifies exhaust gas to remove harmful materials contained in the exhaust gas, but also for production of a DPF having a filter structure in which the cells of the honeycomb structure are alternately plugged in a checkered flag pattern at both end faces.

DESCRIPTION OF PREFERRED EMBODIMENTS

The present invention will be explained in more detail using the following examples, which should not be construed as limiting the invention in any manner.

EXAMPLES 1–3, COMPARATIVE EXAMPLES 1 AND 2, AND REFERENCE EXAMPLE 1

A dried honeycomb product made using a cordierite raw material for DPF was roughly ground by a hammer mill and crushed by a roll crusher and, if necessary, passed through a sieve to obtain the recycled raw material shown in Table 1. Next, a starting raw material was prepared by adding 30% by weight of the recycled raw material to 70% by weight of a cordierite raw material, and a binder was added to the resulting starting raw material. This was mixed by a plowshare mixer for 3 minutes, and a pore forming material was added to the mixture, followed by mixing for 3 minutes by a plowshare mixer, adding water by spraying, mixing for 3 minutes and kneading by a sigma type kneader for 60 minutes to obtain a clay. The resulting clay was formed into a cylindrical clay by a vacuum kneading machine, which was molded into a honeycomb shape by a ram extrusion molding machine. The resulting honeycomb molded product was subjected to microwave drying and then hot air drying to obtain a dried honeycomb product. The resulting dried honeycomb product was cut to a desired size, and the cells were alternately plugged in a checkered flag pattern at bot end faces with a material for plugging the end faces prepared by slurrying a cordierite raw material, followed by firing at 1420° C. for 6 hours to obtain a DPF (cell construction: thickness of ribs: 0.3 mm, the number of cells: 47 cells/cm$^3$, size: 229 mmφ×254 mm in length) (Examples 1–3, Comparative Examples 1 and 2).

Furthermore, a DPF was obtained in the same method as above, except for using a starting material comprising 100% of the cordierite raw material for DPF (Reference Example 1). Characteristics of the resulting DPF are shown in Table 1.

The cordierite raw material for DPF used was a composition comprising 10–30% by weight of kaolin having an average particle diameter of 5–10 μm, 37–41% by weight of talc having an average particle diameter of 20–30 μm, 10–20% by weight of aluminum hydroxide having an average particle diameter of 2–5 μm, 10–20% by weight of aluminum oxide having an average particle diameter of 4–8 μm, and 5–20% by weight of fused silica or quartz having an average particle diameter of 20–50 μm.

cells: 140 cells/cm$^3$, size: 103 mmφ×129 mm in length) (Examples 4–6, and Comparative Examples 3 and 4).

Furthermore, a honeycomb structure was obtained in the same method as above, except for using a starting material comprising 100% of a cordierite raw material for purification of gasoline engine exhaust gas (Reference Example 2). Characteristics of the resulting honeycomb structure are shown in Table 2.

TABLE 1

| | Particle size distribution of recycled raw material | | | | Honeycomb characteristics | | | |
|---|---|---|---|---|---|---|---|---|
| | Average particle diameter (μm) | 45 μm or less (wt %) | 1400 μm or more (wt %) | 2800 μm or more (wt %) | Average pore diameter (μm) | Porosity (%) | Coefficient of thermal expansion (×10$^{-6}$/°C.) | The number of defective cells |
| Exam. 1 | 100 | 20 | 0.5 | 0.0 | 22 | 59 | 0.6 | 0 |
| Exam. 2 | 500 | 4 | 1.0 | 0.0 | 23 | 59 | 0.6 | 0 |
| Exam. 3 | 1000 | 3 | 10.0 | 4.0 | 24 | 60 | 0.6 | 0 |
| Comp. Exam. 1 | 7 | 92 | 0.0 | 0.0 | 14 | 58 | 0.8 | 0 |
| Comp. Exam. 2 | 3200 | 1 | 73.0 | 57.0 | 27 | 65 | 0.8 | 6 |
| Ref. Exam. 1 | — | — | — | — | 23 | 59 | 0.6 | 0 |

EXAMPLES 4–6, COMPARATIVE EXAMPLES 3 AND 4, AND REFERENCE EXAMPLE 2

A dried honeycomb product made using a cordierite raw material for purification of gasoline engine exhaust gas was crushed by a roll crusher and ground by a disinter and, if necessary, passed through a sieve to obtain the recycled raw material shown in Table 2. Next, a starting raw material was prepared by adding 30% by weight of the recycled raw material to 70% by weight of a cordierite raw material, and a binder was added to the resulting starting raw material. This was mixed by a plowshare mixer for 5 minutes, and water was added to the mixture by spraying, followed by mixing for 5 minutes by a plowshare mixer. The mixture was molded into a honeycomb shape by a biaxial continuous molding machine. The resulting honeycomb product was subjected to microwave drying and then hot air drying to obtain a dried honeycomb product. The resulting dried honeycomb product was cut to a desired size, and fired at 1420° C. for 4 hours to obtain a honeycomb structure (cell construction: thickness of ribs: 0.05 mm, the number of The cordierite raw material for purification of gasoline engine exhaust gas used was a composition comprising 0–40% by weight of kaolin having an average particle diameter of 2–10 μm, 37–41% by weight of talc having an average particle diameter of 5–20 μm, 0–25% by weight of aluminum hydroxide having an average particle diameter of 0.5–5 μm, 0–25% by weight of aluminum oxide having an average particle diameter of 2–8 μm, and 0–25% by weight of fused silica or quartz having an average particle diameter of 3–20 μm.

TABLE 2

| | Particle size distribution of recycled raw material | | | | Honeycomb characteristics | | | |
|---|---|---|---|---|---|---|---|---|
| | Average particle diameter (μm) | 45 μm or less (wt %) | 1400 μm or more (wt %) | 2800 μm or more (wt %) | Average pore diameter (μm) | Porosity (%) | Coefficient of thermal expansion (×10$^{-6}$/°C.) | The number of defective cells |
| Exam. 4 | 10 | 90 | 0.0 | 0.0 | 3 | 34 | 0.6 | 0 |
| Exam. 5 | 500 | 5 | 2.0 | 0.5 | 3 | 34 | 0.5 | 0 |
| Exam. 6 | 2000 | 1 | 17.0 | 10.0 | 3 | 34 | 0.5 | 0 |
| Comp. Exam. 3 | 6 | 93 | 0.0 | 0.0 | 3 | 34 | 0.8 | 4 |
| Comp. Exam. 4 | 3300 | 1 | 25.0 | 16.0 | 12 | 39 | 0.8 | 12 |
| Ref. Exam. 2 | — | — | — | — | 3 | 34 | 0.5 | 0 |

The particle size distribution of the recycled raw material was measured in the following manner.

The particle size distribution of the particles of 45 μm or more was measured by a standard sieve of JIS.

The particle size distribution of the particles of 45 μm or less was measured by a laser diffraction method using a particle size distribution measuring machine (LA-910 manufactured by Horiba Seisakusho Co., Ltd.).

The honeycomb characteristics were measured by the following methods.

(1) Average Pore Diameter

Pore distribution and average pore diameter were measured by a mercury intrusion type porosimeter manufactured by Micromeritecs Co., Ltd.

(2) Porosity

The porosity was calculated from total pore volume assuming the true specific gravity of cordierite to be 2.52 g/cc.

(3) Coefficient of Thermal Expansion

The honeycomb fired product was cut out in the flow path direction and coefficient of thermal expansion at 40–800° C. was measured.

(4) The Number of Defective Cells

Fifty honeycomb structures were continuously molded and the number of defective cells per one of the 51st honeycomb structure was counted.

Consideration on the results of Examples 1–3, Comparative Examples 1 and 2, and Reference Example 1:

As shown in Table 1, honeycomb characteristics obtained in Examples 1–3 are satisfactory and equal to those obtained in Reference Example 1.

On the other hand, in Comparative Example 1, since the raw material for DPF was pulverized to an average particle diameter of 7 µm, the average pore diameter of the honeycomb structure decreased to 14 µm. Furthermore, the coefficient of thermal expansion of honeycomb structure was high, namely, $0.8 \times 10^{-6}/°$ C. It is considered that this is because the reactivity of the raw material particles became extraordinary by the pulverization.

In Comparative Example 2, since the recycled raw material was coarse in particle size, the recycled raw material was not sufficiently dissolved at the steps of mixing and kneading, resulting in large average pore diameter, porosity and coefficient of thermal expansion and occurrence of defects in cells.

Consideration on the results of Examples 4–6, Comparative Examples 3 and 4, and Reference Example 2:

As shown in Table 2, honeycomb characteristics obtained in Examples 4–6 were satisfactory and equal to those obtained in Reference Example 2.

On the other hand, in Comparative Example 3, defects in cells occurred due to incorporation of wear powders from equipment caused by pulverization. Furthermore, the coefficient of thermal expansion of honeycomb structure increased. It is considered that this is because the reactivity of the raw material particles became extraordinary by the pulverization.

In Comparative Example 4, since the recycled raw material was coarse in particle size as in Comparative Example 2, the recycled raw material was not sufficiently dissolved, resulting in large average pore diameter, porosity and coefficient of thermal expansion and occurrence of defects in cells.

INDUSTRIAL APPLICABILITY

The method for producing honeycomb structures according to the present invention can be suitably used for producing filters for catching and removing particulate materials contained in dust-containing fluid such as diesel engine exhaust gas (diesel particulate filter (DPF)) or catalyst carriers which support catalyst components for purification of exhaust gas to remove harmful materials contained therein.

The invention claimed is:

1. A method for producing a honeycomb structure, the method comprising:
    providing a starting material for producing the honeycomb structure;
    obtaining a recycled raw material recycled from a recovered material which is produced in the production process of a honeycomb structure and originates from the starting material for the honeycomb structure;
    grinding the recycled raw material so that the recycled raw material has an average particle diameter of 10–2000 µm and contains 10% or less by weight of particles having an average particle diameter of 2800 µm or more; and
    adding the recycled raw material to the starting material to prepare the starting material for producing the honeycomb structure.

2. A method according to claim 1, wherein grinding of the recycled raw material results in the recycled material having an average particle diameter of 100–1000 µm and containing 20% or less by weight of particles having an average particle diameter of 45 µm or less and 10% or less by weight of particles having a particle diameter of 1400 µm or more.

3. A method according to claim 1, wherein the recovered material originating from the starting material is an unfired dried material.

4. A method according to claim 2, wherein the recovered material originating from the starting material is an unfired dried material.

5. A method according to claim 1, wherein the honeycomb structure comprises a cordierite material.

6. A method according to claim 2, wherein the honeycomb structure comprises a cordierite material.

7. A method according to claim 3, wherein the honeycomb structure comprises a cordierite material.

8. A method according to claim 1, wherein the honeycomb structure has a filter structure in which the cells are alternately plugged in a checkered flag pattern at both end faces.

9. A method according to claim 2, wherein the honeycomb structure has a filter structure in which the cells are alternately plugged in a checkered flag pattern at both end faces.

* * * * *